United States Patent
Niu et al.

(10) Patent No.: US 9,667,774 B2
(45) Date of Patent: May 30, 2017

(54) METHODS AND DEVICES FOR SENDING VIRTUAL INFORMATION CARD

(71) Applicant: Xiaomi Inc., Beijing (CN)

(72) Inventors: Kun Niu, Beijing (CN); Wankun Yang, Beijing (CN); Dongya Jiang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/082,490

(22) Filed: Mar. 28, 2016

(65) Prior Publication Data
US 2016/0352891 A1    Dec. 1, 2016

(51) Int. Cl.
*H04M 3/42*    (2006.01)
*H04M 1/725*    (2006.01)
*H04M 1/2745*    (2006.01)
*H04M 1/57*    (2006.01)
*H04W 8/20*    (2009.01)

(52) U.S. Cl.
CPC . *H04M 1/72597* (2013.01); *H04M 1/274516* (2013.01); *H04M 1/575* (2013.01); *H04M 3/42042* (2013.01); *H04M 3/42059* (2013.01); *H04W 8/20* (2013.01)

(58) Field of Classification Search
CPC ......... H04M 3/42042; H04M 1/72519; H04M 15/06; H04W 68/00; H04W 4/12
USPC ....... 455/415, 412.1, 458, 550.1; 379/142.06
See application file for complete search history.

(56) References Cited

U.S. PATENT DOCUMENTS 6,175,741 B1 * 1/2001 Alperovich ............ H04W 4/16
                                                           455/458
8,666,046 B2    3/2014   Ozeri et al.
9,165,406 B1 * 10/2015 Gray .................. G06K 9/00456
(Continued)

FOREIGN PATENT DOCUMENTS

CN        101340642 A    1/2009
CN        101729686 A    6/2010
(Continued)

OTHER PUBLICATIONS

International Search Report issued Feb. 3, 2016 in PCT/CN2015/095161(with English translation of Categories of Cited Documents).
(Continued)

*Primary Examiner* — Danh Le
(74) *Attorney, Agent, or Firm* — Oblon, McClelland, Maier & Neustadt, L.L.P.

(57) ABSTRACT

Aspects of the disclosure provide a method for sending a virtual information card that is stored in a cloud storage system. The method includes determining, based on a user operation of a first terminal, whether to include the virtual information card in a call to a second terminal initiated by the first terminal, the virtual information card being associated with a user of the first terminal. The method also includes, when determining to include the virtual information card in the call, sending, by the first terminal, an instruction message to a cloud server of the cloud storage system. The instruction message instructs the cloud server to send data corresponding to the virtual information card to the second terminal such that the virtual information card is displayable in a call receiving interface of the second terminal.

12 Claims, 7 Drawing Sheets

(56) References Cited

U.S. PATENT DOCUMENTS

| | | | | |
|---|---|---|---|---|
| 2010/0285773 | A1* | 11/2010 | Matsuda | H04M 15/00 455/406 |
| 2010/0329438 | A1 | 12/2010 | Yang et al. | |
| 2011/0151850 | A1* | 6/2011 | Haaparanta | H04M 1/2745 455/415 |
| 2012/0178500 | A1* | 7/2012 | Hwang | H04W 8/183 455/558 |
| 2013/0034220 | A1* | 2/2013 | Ozeri | H04M 15/06 379/142.06 |
| 2014/0063317 | A1* | 3/2014 | Jung | G06F 17/30743 348/333.02 |
| 2014/0156545 | A1* | 6/2014 | Clapham | G06Q 10/00 705/311 |

FOREIGN PATENT DOCUMENTS

| | | |
|---|---|---|
| CN | 101820603 A | 9/2010 |
| CN | 103369478 A | 10/2013 |
| CN | 103856324 A | 6/2014 |
| CN | 104853325 A | 8/2015 |
| EP | 1 819 125 A1 | 8/2007 |
| KR | 10-2003-0017297 A | 3/2003 |
| KR | 10-2004-0049725 A | 6/2004 |
| WO | WO 2005/039159 A1 | 4/2005 |
| WO | WO 2007/098508 A1 | 8/2007 |

OTHER PUBLICATIONS

Extended European Search Report issued on Oct. 24, 2016 in Patent Application No. 16165304.3.

Office Action issued on Nov. 29, 2016 in Korean Patent Application No. 10-2016-7000865.

International Search Report issued Feb. 3, 2016 in PCT/CN2015/095161(previously filed, submitting English translation only).

* cited by examiner

METHODS AND DEVICES FOR SENDING VIRTUAL INFORMATION CARD

CROSS-REFERENCE TO RELATED APPLICATIONS

The present application is based upon and claims priority to Chinese Patent Application No. 201510290678.2 filed May 29, 2015, the entire contents of which are incorporated herein by reference.

TECHNICAL FIELD

The present disclosure generally relates to the field of communication technology, and more particularly, to methods and devices for sending a virtual information card.

BACKGROUND

In a conventional telephone call processing, if a phone number of an incoming call received by a user has not been stored in a local contact list, the incoming call will be considered as coming from a stranger, and the user cannot acquire more information about the call or the caller. Therefore, assisting a user to better recognize an incoming call from a stranger would improve user experiences in receiving a phone call.

SUMMARY

Aspects of the disclosure provide a method for sending a virtual information card that is stored in a cloud storage system. The method includes determining, based on a user operation of a first terminal, whether to include the virtual information card in a call to a second terminal initiated by the first terminal, the virtual information card being associated with a user of the first terminal. The method also includes, when determining to include the virtual information card in the call, sending, by the first terminal, an instruction message to a cloud server of the cloud storage system. The instruction message instructs the cloud server to send data corresponding to the virtual information card to the second terminal such that the virtual information card is displayable in a call receiving interface of the second terminal.

In an embodiment, the method further includes acquiring the data corresponding to the virtual information card through a virtual information card setting interface of the first terminal; and uploading the acquired data corresponding to the virtual information card to the cloud server.

In an embodiment, determining whether to include the virtual information card in the call to the second terminal initiated by the first terminal includes receiving an operational command through a call initiating interface of the first terminal, where the call initiating interface contains a setting option with respect to including a virtual information card in an initiated call; and when the operational command indicates that the setting option in the call initiating interface is selected, determining to include the virtual information card in the call to the second terminal initiated by the first terminal.

In an embodiment, the method further includes, when receiving an incoming call by the first terminal, receiving data corresponding to another virtual information card from the cloud server, the another virtual information card being associated with a user of a calling terminal that initiates the incoming call; and displaying the another virtual information card in a call receiving interface of the first terminal.

In an embodiment, the method further includes storing the data corresponding to the another virtual information card displayed in the call receiving interface of the first terminal in a local contact list in response to a user instruction.

Aspects of the disclosure provide a device for sending a virtual information card that is stored in a cloud storage system. The device includes a processor and a memory for storing instructions executable by the processor. The processor is configured to perform determining, based on a user operation of the device, whether to include the virtual information card in a call to a receiving terminal initiated by the device, the virtual information card being associated with a user of the device; and when determining to include the virtual information card in the call, sending, by the device, an instruction message to a cloud server of the cloud storage system, the instruction message instructing the cloud server to send data corresponding to the virtual information card to the receiving terminal such that the virtual information card is displayable in a call receiving interface of the receiving terminal.

In an embodiment, the processor is further configured to perform acquiring the data corresponding to the virtual information card through a virtual information card setting interface of the device; and uploading the acquired data corresponding to the virtual information card to the cloud server.

In an embodiment, when determining whether to include the virtual information card in the call to the receiving terminal initiated by the device, the processor is further configured to perform receiving an operational command through a call initiating interface of the device, where the call initiating interface contains a setting option with respect to including a virtual information card in an initiated call; and when the operational command indicates that the setting option in the call initiating interface is selected, determining to include the virtual information card in the call to the receiving terminal initiated by the device.

In an embodiment, the processor is further configured to perform, when receiving an incoming call, receiving data corresponding to another virtual information card from the cloud server, the another virtual information card being associated with a user of a calling terminal that initiates the incoming call; and displaying the another virtual information card in a call receiving interface of the device.

In an embodiment, the processor is further configured to perform storing the data corresponding to the another virtual information card displayed in the call receiving interface of the device in a local contact list in response to a user instruction.

Aspects of the disclosure provide a non-transitory computer-readable storage medium storing instructions that, when being executed by a processor of a first terminal, for performing a method for sending a virtual information card that is stored in a cloud storage system. The method includes determining, based on a user operation of the first terminal, whether to include the virtual information card in a call to a second terminal initiated by the first terminal, the virtual information card being associated with a user of the first terminal; and when determining to include the virtual information card in the call, sending, by the first terminal, an instruction message to a cloud server of the cloud storage system, the instruction message instructing the cloud server to send data corresponding to the virtual information card to the second terminal such that the virtual information card is displayable in a call receiving interface of the second terminal.

BRIEF DESCRIPTION OF THE DRAWINGS

The accompanying drawings, which are incorporated in and constitute a part of this specification, illustrate embodiments consistent with the present disclosure and, together with the description, serve to explain the principles of various embodiments of the present disclosure.

DETAILED DESCRIPTION

Figure 1:
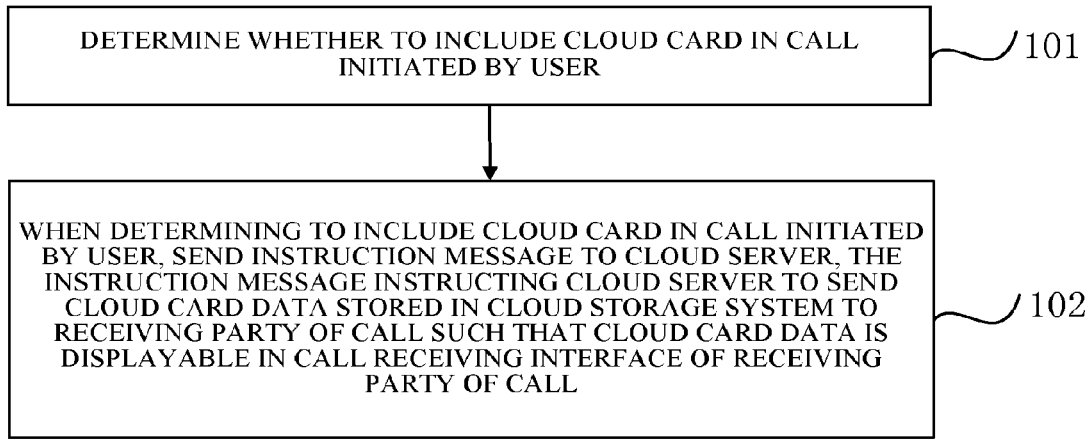
FIG. 1 is a flow chart illustrating a method for sending a cloud card according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The embodiments illustrated in the following description do not represent all implementations consistent with the present disclosure. Instead, they are merely examples of apparatuses and methods consistent with various aspects related to the present disclosure.

The terms used herein are merely for describing a particular embodiment, rather than limiting the present disclosure. As used in the present disclosure and the appended claims, terms in singular form such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to".

The present disclosure provides a method for sending a virtual information card that is stored in a cloud storage system, in which it is determined whether a user has selected to include the virtual information card in a call initiated by the user; when the user has selected to include the virtual information card in a call initiated by the user, the cloud server is instructed to send cloud card data of the user which is stored in the cloud server to a receiving party of the call; and when the receiving party receives the cloud card data of the user from the cloud server, the virtual information card corresponding to the cloud card data can be displayed in a call receiving interface. Thereby, the receiving party of the call can acquire personal information about the initiating party of the call by viewing the virtual information card displayed in the call receiving interface. Thus, the user experience in the phone call can be improved.

In the present disclosure, a virtual information card stored in a cloud storage system is also simplified as a cloud card. A cloud card is an electronic personal information card or electronic business card created by a user and stored in the cloud storage system. A cloud card can contain basic personal information such as a name, contact information, company, and an email address of the user. It can also contain multimedia card data set by the user, such as a high-definition portrait, voice self-introduction and video self-introduction etc., which are set by the user through a setting interface.

FIG. 1 is a flow chart of a method for sending a cloud card according to an exemplary embodiment, which is applied in a first terminal. As shown in FIG. 1, the method includes the following steps.

In step 101, it is determined whether a user has selected to include a cloud card in a call initiated by the user. In some embodiments, the first terminal determines, based on a user operation of the first terminal, whether to include the cloud card in a call to a second terminal initiated by the first terminal. The virtual information card or the cloud card is associated with the first terminal and usable to identify the user.

In step 102, when determining to include the virtual information card in the call, an instruction is sent to a cloud server of the cloud storage system by the first terminal. The instruction instructs the cloud server to send data corresponding to the cloud card to the second terminal such that the cloud card is displayable in a call receiving interface of the second terminal.

In the present embodiment, the first terminal can be a mobile terminal of the user. For example, the mobile terminal can be a smart mobile phone of the user. The cloud server can be a server, a server cluster or a cloud platform which provides a cloud service for the mobile terminal.

In some embodiments, to set a cloud card, the user can enable a cloud card function on the mobile terminal. For example, a cloud-card enabling option can be provided on the mobile terminal, and the user of the mobile terminal can enable the cloud card function by selecting this option.

After the cloud card function is enabled, the user can set his cloud card data through a cloud-card setting interface, which is provided in the mobile terminal for the user. After the user completes the settings of the cloud card data in the cloud-card setting interface, the mobile terminal can acquire the cloud card data set by the user through the cloud-card setting interface. The mobile terminal of the user can upload the cloud card data set by the user to the cloud server.

After it receives the cloud card data uploaded by the mobile terminal of the user, the cloud server can store the received cloud card data in the cloud storage system and store the cloud card data as corresponding to the user for subsequent retrieving.

For example, to set the cloud card data as corresponding to the user, the cloud server can assign a unique identification for the cloud card data in the cloud storage system, such as a cloud card ID. Then the assigned cloud card ID is sent to the mobile terminal of the user to be stored therein. Meanwhile, the cloud server can also, in the cloud storage system, store the assigned cloud card ID as corresponding to the stored cloud card data of the user.

In the present embodiment, after cloud card data set by the user in the cloud-card setting interface is properly uploaded to the cloud server, when a user initiates a call to other contacts, the user, as an initiating party of a call, can select to include his cloud card in a call initiated by him, such that when the receiving party of the call receives the call initiated by the user, the cloud card of the user can be displayed in the call receiving interface.

In an implementation, a setting option for carrying a cloud card in an initiated call can be provided in the call initiating interface. When a user initiates a call, the user as the initiating party can select the setting option in the call initiating interface, to select to include a cloud card in the call. Meanwhile, in the background of the system, the mobile terminal can receive in real time the operational command input and triggered by the user as he operates in the call initiating interface. If it receives a command of the user for selecting the setting option in the call initiating interface, the mobile terminal can determine that the user has selected the setting option. At this time, when a call is initiated to other contacts, the cloud card of the user can be included in the call. For example, assuming that the mobile terminal has a touch screen, the user can touch the setting option to trigger a selection command to the background of the mobile terminal. When the mobile terminal in the background monitors the touch event of the user with respect to the setting option, and receives the selection command triggered by the user touching the setting option, the mobile terminal can determine that the user has selected the setting option.

In some embodiments, the above call initiating interface can be a dial interface of the mobile terminal, or can be a contact interface in a local contact list of the mobile terminal.

For example, in a scenario, when a user initiates a call to a stranger, the user as the initiating party of the call can generally directly dial the telephone number of the stranger in the dial interface. In such a scenario, the setting option can be a preset setting option "dial and include a personal cloud card" in the dial interface. When the user initiates a call, the user can directly select the setting option in the dial interface to include his cloud card in the call initiated by him.

In another scenario, when a user initiates a call to a contact in a local contact list, the user as the initiating party of the call can generally directly operate in the local contact list to initiate the call. In such a scenario, the setting option can be a preset setting option "dial and include a personal cloud card" in the local contact list. The user can directly select the setting option in the local contact list to include his cloud card in the call initiated by him. For example, assuming that the mobile terminal has a touch screen, when he initiates a call to a contact in the local contact list, the user can touch with a long press with respect to the contact to trigger the system to display the setting option "dial and carry a personal cloud card". Then, the user can touch the setting option to select the setting option and to include his cloud card in the call initiated by him.

In the present embodiment, since the cloud card data set by the user has already been uploaded to the cloud server, when the user, as the initiating party, initiates a call on the mobile terminal, the mobile terminal can send to the cloud server an instruction message, the instruction message being used for instructing the cloud server to send cloud card data of the initiating user which is stored in the cloud server to a receiving party of the call. The instruction message can include the cloud card ID of the cloud card data of the initiating user which is assigned by the cloud server.

After the cloud server receives the instruction message, according to the cloud card ID, the cloud server can search in the cloud card data that are already stored in the cloud server for the cloud card data of the initiating party which corresponds to the cloud card ID. Then, when the cloud card data corresponding to a matched cloud card ID is found, the found cloud card data of the initiating party is sent to the receiving party of the call initiated by the initiating party. After a mobile terminal of the receiving party of the call receives the cloud card data from the cloud server, the mobile terminal of the receiving party of the call can display the cloud card corresponding to the received cloud card data in the call receiving interface. Meanwhile, the receiving party of the call can also operate on the cloud card data displayed in the call receiving interface, to select to store the cloud card data displayed in the call receiving interface to the local contact list.

Thereby, in a scenario of receiving a call initiated by a stranger, when the receiving party of the call receives a call from a stranger, the receiving party can acquire personal information about the stranger by viewing the cloud card of the stranger, which is displayed in the call receiving interface, so as to fully recognize the stranger.

In a scenario of receiving a call initiated by a contact in the local contact list, since the cloud card data set by the contact can include multimedia cloud card data set by the contact in addition to basic personal information of the user, the receiving party of the call can acquire multimedia cloud card data set by the contact, such as a most recent high-definition portrait set by the contact, by viewing the cloud card data set by the contact which is displayed in the call receiving interface. Thus, the user experience in a phone call can be improved.

The above described is a process in which a local user of a mobile terminal, as an initiating party, initiates a call, when the local user as a receiving party receives a call initiated by a remote contact, through the above described process, cloud card data of the remote contact can be sent from the cloud server and displayed in the call receiving interface.

In the present embodiment, the remote contact can also set his cloud card data on the mobile terminal, and then upload the set cloud card data to the cloud server. When the remote contact as an initiating party initiates a call to the local user, the remote contact can also select to include his cloud card data in the initiated call and send an instruction message to the cloud server for instructing the cloud server to send the locally-saved cloud card data of the remote contact to the local user.

When the mobile terminal of the local user receives the call of the remote contact, the cloud card data of the remote contact which is received from the cloud server can be displayed in the call receiving interface. The local user can operate on the cloud card data displayed in the call receiving interface to select to store the cloud card data in the local contact list.

For example, assuming that the mobile terminal has a touch screen, the user can perform a long press operation on the cloud card data displayed in the call receiving interface, to trigger the background process of the mobile terminal to send a storing command for storing the cloud card data in the local contact list. When the mobile terminal in the background monitors the long press event with respect to the setting option, and receives the storing command triggered by the long press operation by the user with respect to the setting option, the mobile terminal can store the cloud card data in the local contact list.

In the above embodiment, it is determined whether a user has selected to include a cloud card in a call initiated by the user; when the user has selected to include a cloud card in a call initiated by the user, the cloud server is instructed to send cloud card data of the user which is stored in the cloud server to a receiving party of the call; and when the receiving party receives the cloud card data of the user from the cloud server, the cloud card data can be displayed in a call receiving interface. Thereby, the receiving party of the call can acquire personal information about the initiating party of the call by viewing the cloud card data displayed in the call receiving interface. Thus, the user experience in the phone call can be improved.

Figure 2:
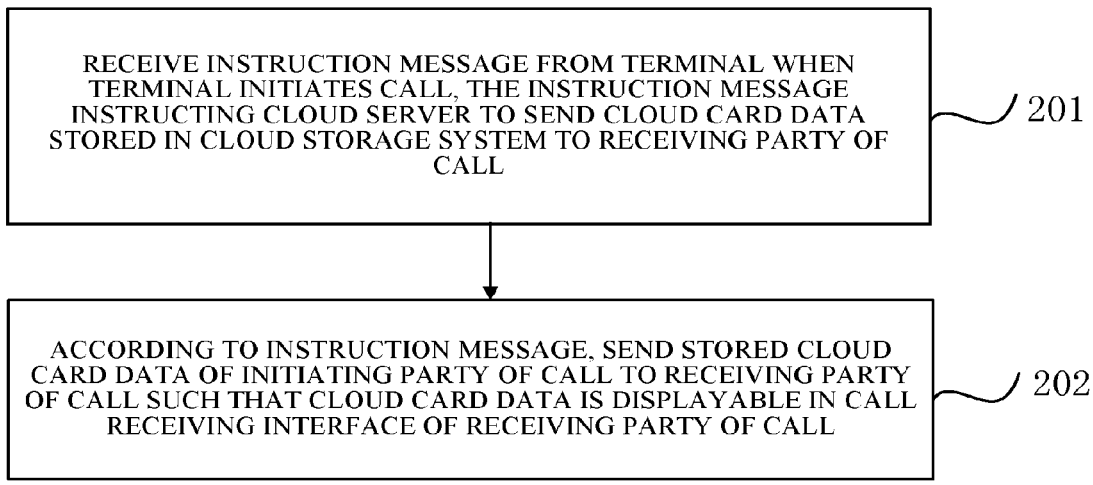
FIG. 2 is a flow chart illustrating another method for sending a cloud card according to an exemplary embodiment.

FIG. 2 is a flow chart illustrating a method for sending a cloud card according to an exemplary embodiment, which is applied in a cloud server. As shown in FIG. 2, the method includes the following steps.

In step 201, the server receives an instruction message which is sent by a terminal when the terminal initiates a call, where the instruction message is used for instructing the cloud server to send cloud card data corresponding to the cloud card of an initiating party of the call which is stored in the cloud storage system to a receiving party of the call.

In step 202, according to the instruction message, the stored cloud card data of the initiating party of the call is sent to the receiving party of the call such that the cloud card or the cloud card data is displayed in a call receiving interface of the receiving party of the call.

In the present embodiment, the cloud server can be a server, a server cluster or a cloud platform which provides a cloud service for the mobile terminal. The terminal can be a mobile terminal of the user. For example, the mobile terminal can be a smart mobile phone of the user.

In some embodiments, to set a cloud card, the user can enable a cloud card function on the mobile terminal. For example, a cloud-card enabling option can be provided on the mobile terminal, and the user of the mobile terminal can enable the cloud card function by selecting this option.

After the cloud card function is enabled, the user can set his cloud card data through a cloud-card setting interface which is provided in the mobile terminal for the user. After the user completes the settings of the cloud card data in the cloud-card setting interface, the mobile terminal can acquire the cloud card data set by the user through the cloud-card setting interface. The mobile terminal of the user can upload the cloud card data set by the user to the cloud server.

After it receives the cloud card data uploaded by the mobile terminal of the user, the cloud server can store the received cloud card data in the cloud storage system and store the cloud card data as corresponding to the user for subsequent retrieving.

For example, to set the cloud card data as corresponding to the user, the cloud server can assign a unique identification for the cloud card data in local, such as a cloud card ID. Then the assigned cloud card ID is sent to the mobile terminal of the user to be stored therein. Meanwhile, the cloud server can also, in the cloud storage system, store the assigned cloud card ID as corresponding to the stored cloud card data of the user.

In the present embodiment, after cloud card data set by the user in the cloud-card setting interface is properly uploaded to the cloud server, when he initiates a call to other contacts, the user, as an initiating party of a call, can select to include his cloud card in a call initiated by him, such that when the receiving party of the call receives the call initiated by the user, the cloud card of the user can be displayed in the call receiving interface.

In an implementation, a setting option for carrying a cloud card in an initiated call can be provided in the call initiating interface. When a user initiates a call, the user as the initiating party can select the setting option in the call initiating interface, to select to include a cloud card in the call. Meanwhile, in the background of the system, the mobile terminal can receive in real time the operational command input and triggered by the user as he operates in the call initiating interface. If it receives a command of the user for selecting the setting option in the call initiating interface, the mobile terminal can determine that the user has selected the setting option. At this time, when a call is initiated to other contacts, the cloud card of the user can be included in the call. For example, assuming that the mobile terminal has a touch screen, the user can touch the setting option to trigger a selection command to the background process of the mobile terminal. When the mobile terminal in the background monitors the touch event of the user with respect to the setting option, and receives the selection command triggered by the user touching the setting option, the mobile terminal can determine that the user has selected the setting option.

In some embodiments, the above call initiating interface can be a dial interface of the mobile terminal, or can be a contact interface in a local contact list of the mobile terminal.

For example, in a scenario, when a user initiates a call to a stranger, the user as the initiating party of the call can generally directly dial the telephone number of the stranger in the dial interface. In such a scenario, the setting option can be a preset setting option "dial and include a personal cloud card" in the dial interface. When a user initiates a call, the user can directly select the setting option in the dial interface to include his cloud card in the call initiated by him.

In another scenario, when a user initiates a call to a contact in a local contact list, the user as the initiating party of the call can generally directly operate in the local contact list to initiate the call. In such a scenario, the setting option can be a preset setting option "dial and include a personal cloud card" in the local contact list. The user can directly select the setting option in the local contact list to carry his include card in the call initiated by him. For example, assuming that the mobile terminal has a touch screen, when he initiates a call to a contact in the local contact list, the user can touch with a long press with respect to the contact to trigger the system to display the setting option "dial and include a personal cloud card". Then, the user can touch the setting option to select the setting option and to include his cloud card in the call initiated by him.

In the present embodiment, since the cloud card data set by the user has already been uploaded to the cloud server, when the user, as the initiating party, initiates a call on the mobile terminal, the mobile terminal can send to the cloud server an instruction message, where the instruction message is used for instructing the cloud server to send cloud card data of the initiating user which is stored in the cloud server to a receiving party of the call. The instruction message can carry the cloud card ID of the cloud card data of the initiating user which is assigned by the cloud server.

After cloud server receives the instruction message, according to the cloud card ID, the cloud server can search in the cloud card data that are already stored in the cloud server for the cloud card data of the initiating party which corresponds to the cloud card ID. Then, when the cloud card data corresponding to a matched cloud card ID is found, the found cloud card data of the initiating party is sent to the receiving party of the call initiated by the initiating party. After a mobile terminal of the receiving party of the call receives the cloud card data pushed by the cloud server, the mobile terminal of the receiving party of the call can display cloud card corresponding to the received cloud card data in the call receiving interface. Meanwhile, the receiving party of the call can also operate on the cloud card data displayed in the call receiving interface, to select to store the cloud card data displayed in the call receiving interface to the local contact list.

Thereby, in a scenario of receiving a call initiated by a stranger, when the receiving party of the call receives a call from a stranger, the receiving party can acquire personal information about the stranger by viewing the cloud card of the stranger which is displayed in the call receiving interface, so as to fully recognize the stranger.

In a scenario of receiving a call initiated by a contact in the local contact list, since the cloud card data set by the contact can include multimedia cloud card data set by the contact in addition to basic personal information of the user, the receiving party of the call can acquire multimedia cloud card data set by the contact such as a most recent high-definition portrait set by the contact by viewing the cloud card data set by the contact which is displayed in the call receiving interface. Thus, the user experience in a phone call can be improved.

The above described is a process in which a local user of a mobile terminal, as an initiating party, initiates a call, when the local user as a receiving party receives a call initiated by a remote contact, through the above described process, cloud card data of the remote contact can be sent from the cloud server and displayed in the call receiving interface.

In the present embodiment, the remote contact can also set his cloud card data on the mobile terminal, and then upload the set cloud card data to the cloud server. When the remote contact as an initiating party initiates a call to the local user, the remote contact can also select to include his cloud card data in the initiated call and send an instruction message to the cloud server for instructing the cloud server to send the locally-saved cloud card data of the remote contact to the local user.

When the mobile terminal of the local user receives the call of the remote contact, the cloud card data of the remote contact which is received from the cloud server can be displayed in the call receiving interface. The local user can operate on the cloud card data displayed in the call receiving interface to select to store the cloud card data in the local contact list.

For example, assuming that the mobile terminal has a touch screen, the user can perform a long press operation on the cloud card data displayed in the call receiving interface, to trigger the background process of the mobile terminal to send a storing command for storing the cloud card data in the local contact list. When the mobile terminal in the background monitors the long press event with respect to the setting option, and receives the storing command triggered by the long press operation by the user with respect to the setting option, the mobile terminal can store the cloud card data in the local contact list.

In the above embodiment, it is determined whether a user has selected to include a cloud card in a call initiated by the user; when the user has selected to include a cloud card in a call initiated by the user, the cloud server is instructed to send cloud card data of the user which is stored in the cloud server to a receiving party of the call; and when the receiving party receives the cloud card data of the user from the cloud server, the cloud card data can be displayed in a call receiving interface. Thereby, the receiving party of the call can acquire personal information about the initiating party of the call by viewing the cloud card data displayed in the call receiving interface. Thus, the user experience in the phone call can be improved.

Figure 3:
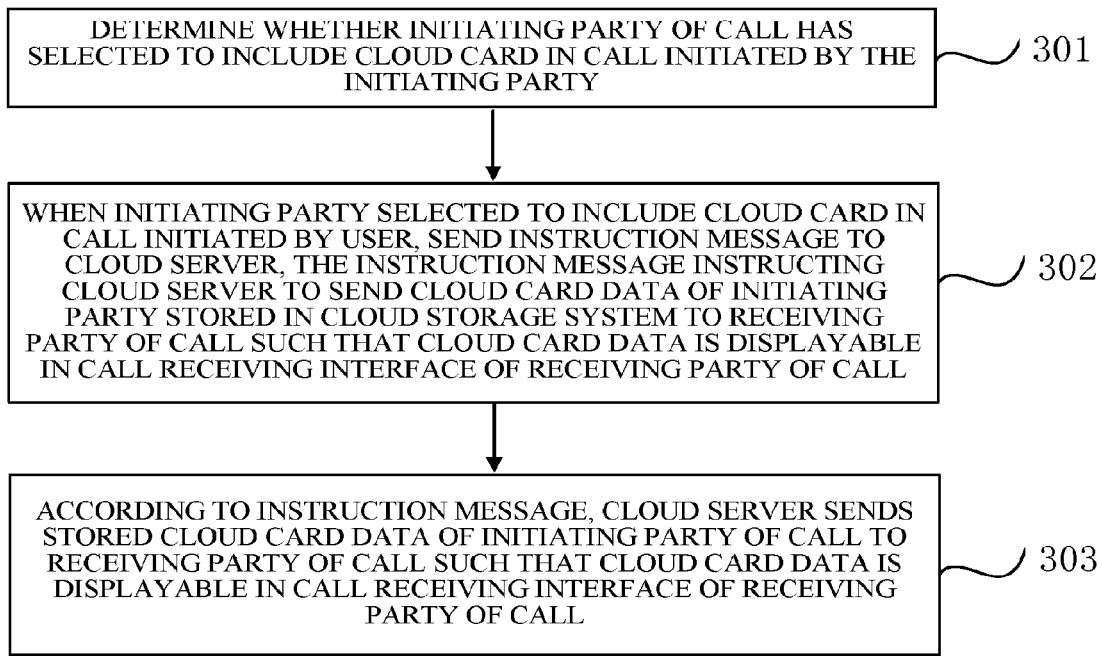
FIG. 3 is a flow chart illustrating another method for sending a cloud card according to an exemplary embodiment.

FIG. 3 is a flow chart illustrating a method for sending a cloud card according to an exemplary embodiment. As shown in FIG. 3, the method includes the following steps.

In step 301, it is determined whether an initiating party of a call has selected to include a cloud card in the call initiated by him.

In step 302, when the initiating party of the call has selected to include a cloud card in the call initiated by him, an instruction message is sent to a cloud server, the instruction message being used for instructing the cloud server to send cloud card data corresponding to the cloud card of the initiating party which is stored in the cloud server to a receiving party of the call such that the cloud card or the cloud card data is displayed in a call receiving interface of the receiving party of the call.

In step 303, according to the instruction message, the cloud server sends the stored cloud card data corresponding to the cloud card of the initiating party of the call to the receiving party of the call such that the cloud card or the cloud card data is displayed in a call receiving interface of the receiving party of the call.

In the present embodiment, the terminal can be a mobile terminal of the user. For example, the mobile terminal can be a smart mobile phone of the user. The cloud server can be a server, a server cluster or a cloud platform which provides a cloud service for the mobile terminal.

In some embodiments, to set a cloud card, the user can enable a cloud card function on the mobile terminal. For example, a cloud-card enabling option can be provided on the mobile terminal, and the user of the mobile terminal can enable the cloud card function by selecting this option.

After the cloud card function is enabled, the user can set his cloud card data through a cloud-card setting interface which is provided in the mobile terminal for the user. After the user completes the settings of the cloud card data in the cloud-card setting interface, the mobile terminal can acquire the cloud card data set by the user through the cloud-card setting interface. The mobile terminal of the user can upload the cloud card data set by the user to the cloud server.

After a cloud server receives the cloud card data uploaded by the mobile terminal of the user, the cloud server can store the received cloud card data in the cloud storage system and store the cloud card data as corresponding to the user for subsequent retrieving.

For example, to set the cloud card data as corresponding to the user, the cloud server can assign a unique identification for the cloud card data in the cloud storage system, such as a cloud card ID. Then the assigned cloud card ID is sent to the mobile terminal of the user to be stored therein.

Meanwhile, the cloud server can also, in the cloud storage system, store the assigned cloud card ID as corresponding to the stored cloud card data of the user.

In the present embodiment, after cloud card data set by the user in the cloud-card setting interface is properly uploaded to the cloud server, when he initiates a call to other contacts, the user, as an initiating party of a call, can select to include his cloud card in a call initiated by him, such that when the receiving party of the call receives the call initiated by the user, the cloud card of the user can be displayed in the call receiving interface.

In an implementation, a setting option for including a cloud card in an initiated call can be provided in the call initiating interface. When he initiates a call, the user as the initiating party can select the setting option in the call initiating interface, to select to include a cloud card in the call. Meanwhile, in the background of the system, the mobile terminal can receive in real time the operational command input and triggered by the user as he operates in the call initiating interface. If it receives a command of the user for selecting the setting option in the call initiating interface, the mobile terminal can determine that the user has selected the setting option. At this time, when a call is initiated to other contacts, the cloud card of the user can be included in the call. For example, assuming that the mobile terminal has a touch screen, the user can touch the setting option to trigger a selection command to the background process of the mobile terminal. When the mobile terminal in the background monitors the touch event of the user with respect to the setting option, and receives the selection command triggered by the user touching the setting option, the mobile terminal can determine that the user has selected the setting option.

In some embodiments, the above call initiating interface can be a dial interface of the mobile terminal, or can be a contact interface in a local contact list of the mobile terminal.

For example, in a scenario, when a user initiates a call to a stranger, the user as the initiating party of the call can generally directly dial the telephone number of the stranger in the dial interface. In such a scenario, the setting option can be a preset setting option "dial and include a personal cloud card" in the dial interface. When the user initiates a call, the user can directly select the setting option in the dial interface to include his cloud card in the call initiated by him.

In another scenario, when a user initiates a call to a contact in a local contact list, the user as the initiating party of the call can generally directly operate in the local contact list to initiate the call. In such a scenario, the setting option can be a preset setting option "dial and include a personal cloud card" in the local contact list. The user can directly select the setting option in the local contact list to carry his cloud card in the call initiated by him. For example, assuming that the mobile terminal has a touch screen, when the user initiates a call to a contact in the local contact list, the user can touch with a long press with respect to the contact to trigger the system to display the setting option "dial and include a personal cloud card". Then, the user can touch the setting option to select the setting option and to include his cloud card in the call initiated by him.

In the present embodiment, since the cloud card data set by the user has already been uploaded to the cloud server, when the user, as the initiating party, initiates a call on the mobile terminal, the mobile terminal can send to the cloud server an instruction message, where the instruction message is used for instructing the cloud server to send cloud card data of the initiating user which is stored in the cloud server to a receiving party of the call. The instruction message can include the cloud card ID of the cloud card data of the initiating user which is assigned by the cloud server.

After it receives the instruction message, according to the cloud card ID, the cloud server can search in the cloud card data that are already stored in the cloud server for the cloud card data of the initiating party which corresponds to the cloud card ID. Then, when the cloud card data corresponding to a matched cloud card ID is found, the found cloud card data of the initiating party is sent to the receiving party of the call initiated by the initiating party. After a mobile terminal of the receiving party of the call receives the cloud card data from the cloud server, the mobile terminal of the receiving party of the call can display the cloud card corresponding to the received cloud card data in the call receiving interface. Meanwhile, the receiving party of the call can also operate on the cloud card data displayed in the call receiving interface, to select to store the cloud card data displayed in the call receiving interface to the local contact list.

Thereby, in a scenario of receiving a call initiated by a stranger, when the receiving party of the call receives a call from a stranger, the receiving party can acquire personal information about the stranger by viewing the cloud card of the stranger which is displayed in the call receiving interface, so as to fully recognize the stranger.

In a scenario of receiving a call initiated by a contact in the local contact list, since the cloud card data set by the contact can include multimedia cloud card data set by the contact in addition to basic personal information of the user, the receiving party of the call can acquire multimedia cloud card data set by the contact, such as a most recent high-definition portrait set by the contact, by viewing the cloud card data set by the contact which is displayed in the call receiving interface. Thus, the user experience in a phone call can be improved.

The above described is a process in which a local user of a mobile terminal, as an initiating party, initiates a call, when the local user as a receiving party receives a call initiated by a remote contact, through the above described process, cloud card data of the remote contact can be sent from the cloud server and displayed in the call receiving interface.

In the present embodiment, the remote contact can also set his cloud card data on the mobile terminal, and then upload the set cloud card data to the cloud server. When the remote contact as an initiating party initiates a call to the local user, the remote contact can also select to include his cloud card data in the initiated call and send an instruction message to the cloud server for instructing the cloud server to send the locally-saved cloud card data of the remote contact to the local user.

When the mobile terminal of the local user receives the call of the remote contact, the cloud card data of the remote contact which is received from the cloud server can be displayed in the call receiving interface. The local user can operate on the cloud card data displayed in the call receiving interface to select to store the cloud card data in the local contact list.

For example, assuming that the mobile terminal has a touch screen, the user can perform a long press operation on the cloud card data displayed in the call receiving interface, to trigger the background process of the mobile terminal to send a storing command for storing the cloud card data in the local contact list. When the mobile terminal in the background monitors the long press event with respect to the setting option, and receives the storing command triggered by the long press operation by the user with respect to the setting option, the mobile terminal can store the cloud card data in the local contact list.

In the above embodiment, it is determined whether a user has selected to include a cloud card in a call initiated by the user; when the user has selected to include a cloud card in a call initiated by the user, the cloud server is instructed to send cloud card data of the user which is stored in the cloud server to a receiving party of the call; and when the receiving party receives the cloud card data of the user from the cloud server, the cloud card or the cloud card data can be displayed in a call receiving interface. Thereby, the receiving party of the call can acquire personal information about the initiating party of the call by viewing the cloud card data displayed in the call receiving interface. Thus, the user experience in the phone call can be improved.

Corresponding to the above method embodiments for sending a cloud card, the present disclosure provides device embodiments.

Figure 4:
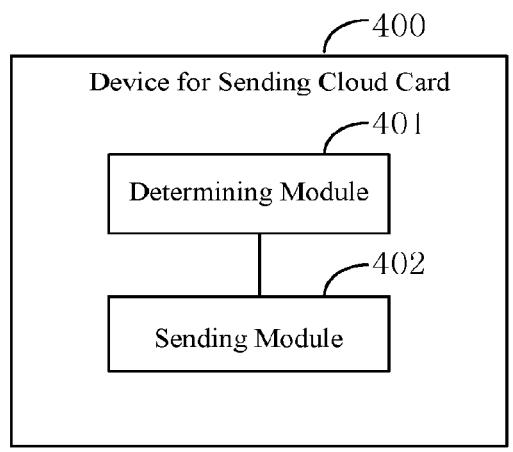
FIG. 4 is a block diagram of a device for sending a cloud card according to an exemplary embodiment.

FIG. 4 is a block diagram of a device for sending a cloud card according to an exemplary embodiment.

As shown in FIG. 4, a device 400 for sending a cloud card according to an exemplary embodiment includes a determining module 401 and a sending module 402.

In some embodiments, the determining module 401 is configured to determine whether a user has selected to include a cloud card in a call initiated by the user.

In some embodiments, the sending module 402 is configured to, when the user has selected to include a cloud card in the call initiated by the user, send an instruction message to a cloud server, where the instruction message is used for instructing the cloud server to send cloud card data of the user which is stored in the cloud server to a receiving party of the call such that the cloud card data is displayed in a call receiving interface of the receiving party of the call.

In the above embodiment, it is determined whether a user has selected to include a cloud card in a call initiated by the user; when the user has selected to include a cloud card in a call initiated by the user, the cloud server is instructed to send cloud card data of the user which is stored in the cloud server to a receiving party of the call; and when the receiving party receives the cloud card data of the user from the cloud server, the cloud card or the cloud card data can be displayed in a call receiving interface. Thereby, the receiving party of the call can acquire personal information about the initiating party of the call by viewing the cloud card data displayed in the call receiving interface. Thus, the user experience in the phone call can be improved.

Figure 5:
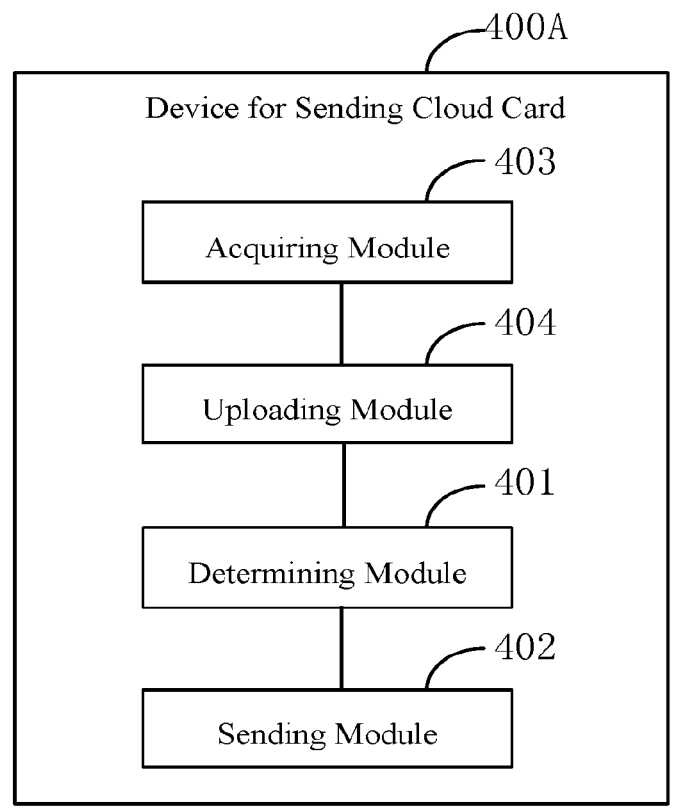
FIG. 5 is a block diagram of another device for sending a cloud card according to an exemplary embodiment.

FIG. 5 is a block diagram of another device for sending a cloud card according to an exemplary embodiment. Based on the embodiment as shown in FIG. 4, the device 400A includes a determining module 401, a sending module 402, an acquiring module 403, and an uploading module 404. The components in FIG. 5 that are the same or similar to those in FIG. 4 are given the same reference numbers, and detailed description thereof is thus omitted.

In some embodiments, the acquiring module 403 is configured to, before it is determined whether a user has selected to include a cloud card in a call initiated by the user, acquire cloud card data of the user which is set by the user in a preset cloud-card setting interface.

In some embodiments, the uploading module 404 is configured to upload the acquired cloud card data to the cloud server.

Figure 6:
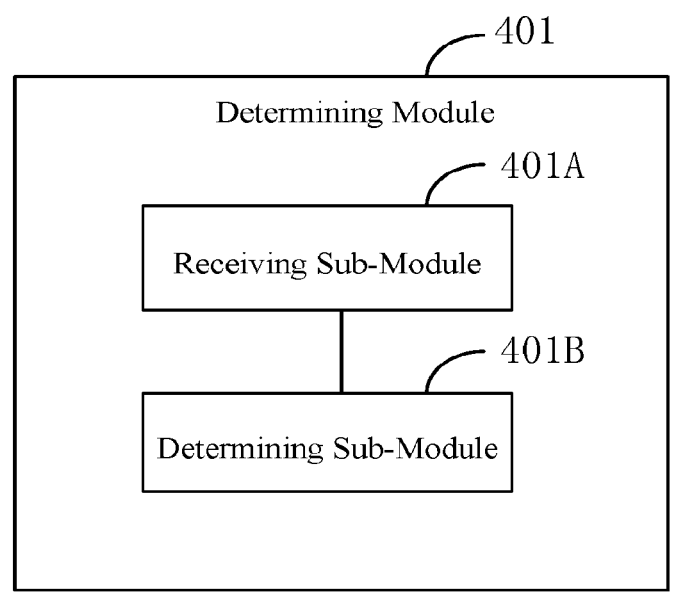
FIG. 6 is a block diagram of a determining module in a device for sending a cloud card according to an exemplary embodiment.

FIG. 6 is a block diagram of a determining module in a device for sending a cloud card according to an exemplary embodiment. Based on the embodiment as shown in FIG. 4, the determining module 401 can include a receiving sub-module 401A and a determining sub-module 401B.

In some embodiments, the receiving sub-module 401A is configured to receive an operational command of a user with respect to a call initiating interface, where the call initiating interface contains a setting option for including a cloud card in an initiated call.

In some embodiments, the determining sub-module 401B is configured to, when it is received a command of the user for selecting the setting option in the call initiating interface, determine that the user has selected to include a cloud card in a call initiated by the user.

It should be noted that, the receiving sub-module 401A and the determining sub-module 401B in the above device embodiment as shown in FIG. 6 can also be included in the above device embodiment as shown in FIG. 4 or FIG. 5. This is not limited in the present disclosure.

Figure 7:
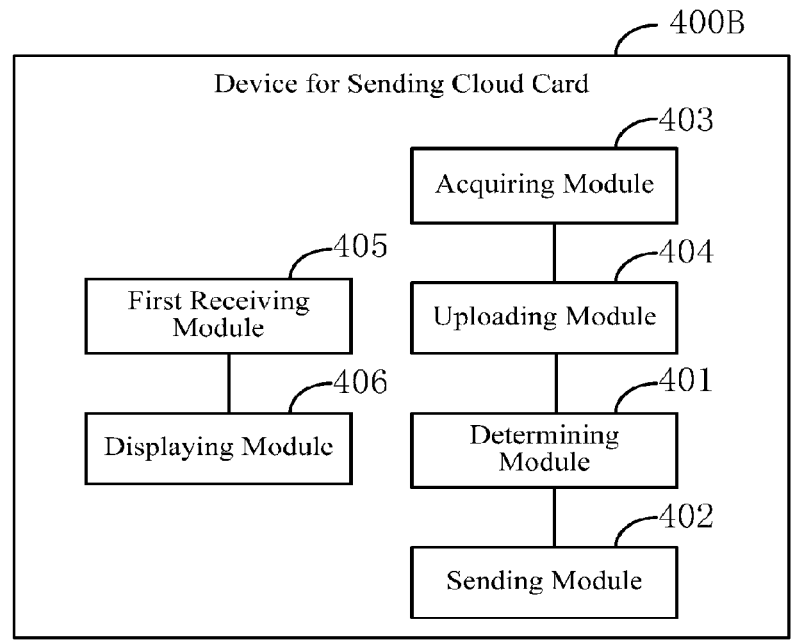
FIG. 7 is a block diagram of another device for sending a cloud card according to an exemplary embodiment.

FIG. 7 is a block diagram of another device for sending a cloud card according to an exemplary embodiment. Based on the embodiment as shown in FIG. 4 and FIG. 5, the device 400B includes a determining module 401, a sending module 402, an acquiring module 403, an uploading module 404, a first receiving module 405, and a displaying module 406. The components in FIG. 7 that are the same or similar to those in FIG. 4 and FIG. 5 are given the same reference numbers, and detailed description thereof is thus omitted.

In some embodiments, the first receiving module 405 is configured to, when an incoming call is received, receive cloud card data of an initiating party of the call which is sent by the cloud server.

In some embodiments, the displaying module 406 is configured to display the received cloud card data in a call receiving interface.

It should be noted that, the first receiving module 405 and the displaying module 406 in the above device embodiment as shown in FIG. 7 can also be included in the above device embodiments as shown in FIG. 4 or FIG. 5. This is not limited in the present disclosure.

Figure 8:
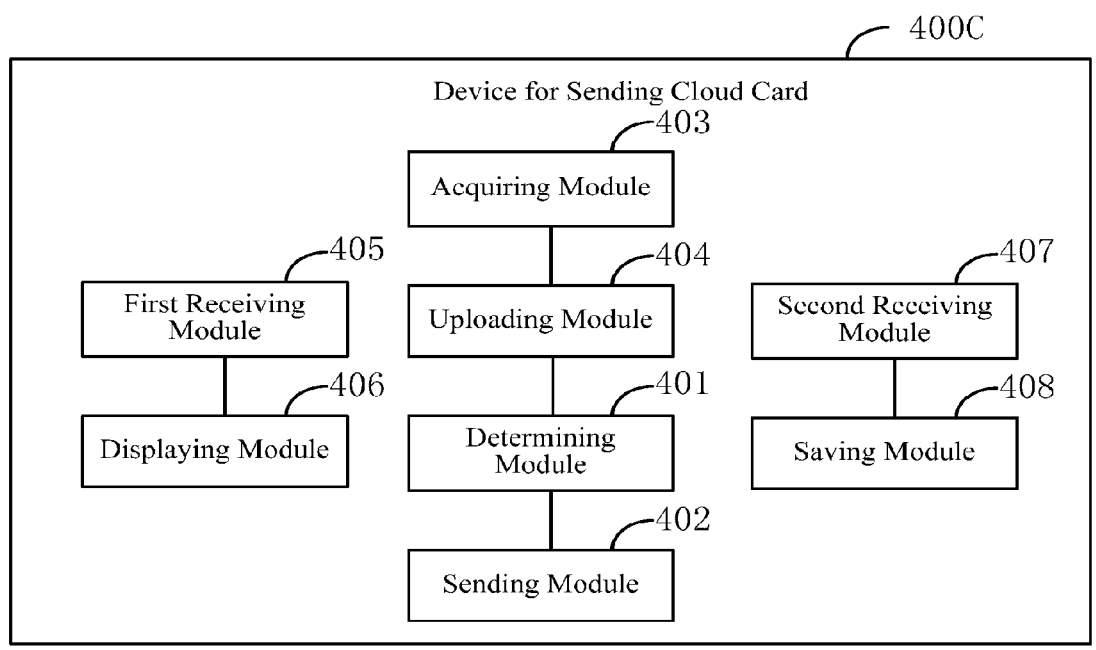
FIG. 8 is a block diagram of another device for sending a cloud card according to an exemplary embodiment.

FIG. 8 is a block diagram of another device for sending a cloud card according to an exemplary embodiment. Based on the embodiment as shown in FIG. 4 and FIG. 7, the device 400C include: a determining module 401, a sending module 402, an acquiring module 403, an uploading module 404, a first receiving module 405, a displaying module 406, a second receiving module 407, and a saving module 408. The components in FIG. 8 that are the same or similar to those in FIGS. 4, 5, and 7 are given the same reference numbers, and detailed description thereof is thus omitted.

In some embodiments, the second receiving module 407 is configured to receive an operational command of a user with respect to the call receiving interface.

In some embodiments, the saving module 408 is configured to, when it is received a command of a user for storing the cloud card data displayed in the call receiving interface, store the cloud card data displayed in the call receiving interface in a local contact list.

It should be noted that, the second receiving module 407 and the saving module 408 in the above device embodiment as shown in FIG. 8 can also be included in the above device embodiments as shown in FIG. 4, 5, or 7. This is not limited in the present disclosure.

Figure 9:
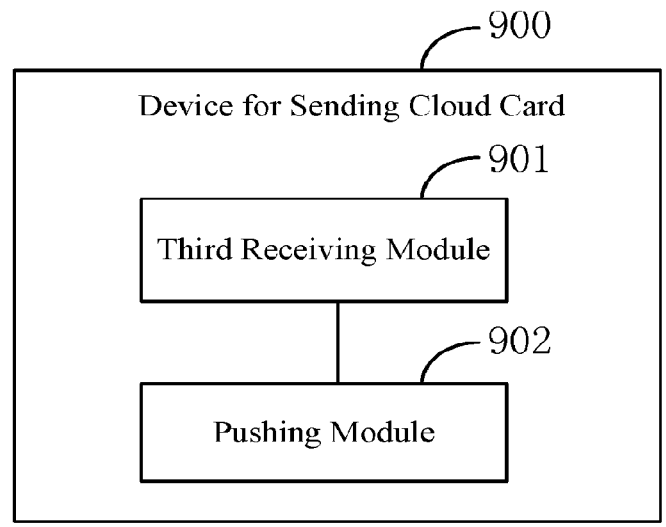
FIG. 9 is a block diagram of another device for sending a cloud card according to an exemplary embodiment.

FIG. 9 is a block diagram of a device for sending a cloud card according to an exemplary embodiment.

As shown in FIG. 9, a device 900 for sending a cloud card according to an exemplary embodiment includes a third receiving module 901 and a pushing module 902.

In some embodiments, the third receiving module 901 is configured to receive an instruction message which is sent by a terminal when the terminal initiates a call. The instruction message is used for instructing a cloud server to send cloud card data of an initiating party of the call which is stored in the cloud storage system to a receiving party of the call.

In some embodiments, the pushing module 902 is configured to, according to the instruction message, send the stored cloud card data of the initiating party of the call to the receiving party of the call such that the cloud card data is displayable in a call receiving interface of the receiving party of the call.

In the above embodiment, it is determined whether a user has selected to include a cloud card in a call initiated by the user; when the user has selected to include a cloud card in a call initiated by the user, the cloud server is instructed to send cloud card data of the user which is stored in the cloud server to a receiving party of the call; and when the receiving party receives the cloud card data of the user from the cloud server, the cloud card data can be displayed in a call receiving interface. Thereby, the receiving party of the call can acquire personal information about the initiating party of the call by viewing the cloud card data displayed in the call receiving interface. Thus, the user experience in the phone call can be improved.

Figure 10:
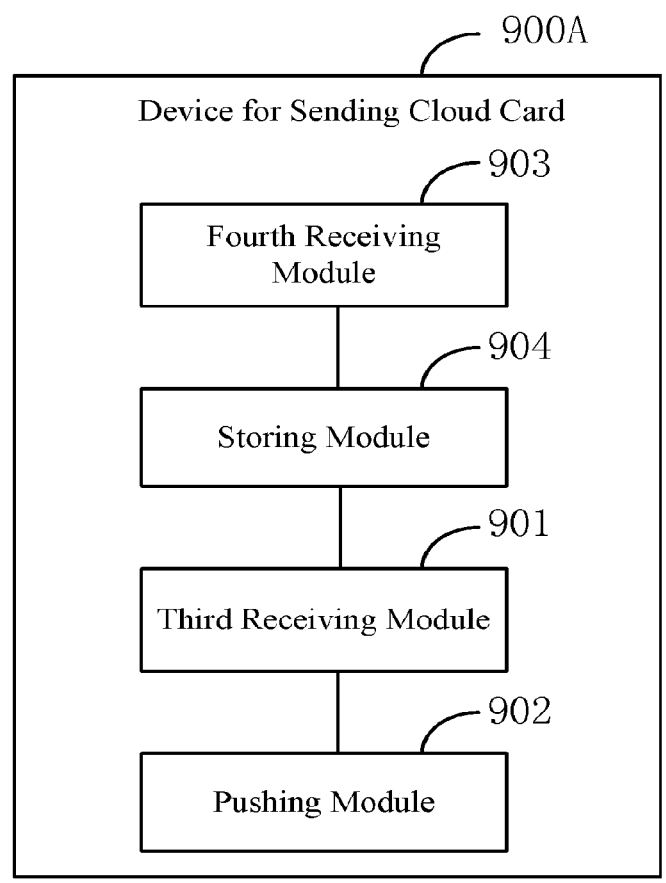
FIG. 10 is a block diagram of another device for sending a cloud card according to an exemplary embodiment.

FIG. 10 is a block diagram of another device for sending a cloud card according to an exemplary embodiment. Based on the embodiment as shown in FIG. 9, the device 900A includes a third receiving module 901, a pushing module 902, a fourth receiving module 903, and a storing module 904. The components in FIG. 10 that are the same or similar to those in FIG. 9 are given the same reference numbers, and detailed description thereof is thus omitted.

In some embodiments, the fourth receiving module 903 is configured to, before it is received an instruction message which is sent by a terminal when the terminal initiates a call, receive cloud card data of the initiating party of the call which is uploaded by the terminal.

In some embodiments, the storing module 904 is configured to store the received cloud card data of the initiating party of the call in local and store the cloud card data as corresponding to the initiating party of the call.

Implementation of the functions and operations of the modules in the above devices can be specifically referred to the implementation of the corresponding steps in the above methods, which will not be repeated herein.

For the device embodiments, since they correspond to the method embodiments, they can be referred to the related part of the description of the method embodiments The device embodiments described above are merely illustrative. The units described as separate may be or may not be physically separate, and the components illustrated as a units may be or may not be physical units, and may be at the same location, or may be distributed to multiple units over the network. A part of or all of the modules can be selected to achieve the objective of the present disclosure as desired. One skilled in the art can understand and practice the embodiments without paying creative labor.

It is noted that any one of the modules or sub-modules described in this disclosure can be implemented as hardware, software, or a combination of hardware and software. In an example, some or all of the modules or sub-modules in the FIGS. 4-10 are implemented as processing circuitry executing software instructions.

In one example, the present disclosure also provides a device for sending a cloud card, and the device includes a processor and a memory for storing instructions executable by the processor. The processor, when executing the stored instructions, is configured to perform a method that includes determining, based on a user operation of the device, whether to include the virtual information card in a call to a receiving terminal initiated by the device; and when determining to include the virtual information card in the call, sending an instruction message to a cloud server of the cloud storage system. The virtual information card is associated with a user of the device. The instruction message instructs the cloud server to send data corresponding to the virtual information card to the receiving terminal such that the virtual information card is displayable in a call receiving interface of the receiving terminal.

In another example, the present disclosure also provides a terminal, including a memory that stores one or more programs therein and one or more processors that are configured to execute the one or more programs. The one or more processors, when executing the stored one or more programs, is configured to perform a method that includes determining whether a user has selected to include a cloud card in a call initiated by the user; and when the user has selected to include a cloud card in the call initiated by the user, sending an instruction message to a cloud server. The instruction message is used for instructing the cloud server to send cloud card data of the user which is stored in the cloud server to a receiving party of the call such that the cloud card data is displayable in a call receiving interface of the receiving party of the call.

In another example, the present disclosure also provides a device for sending a cloud card, and the device includes a processor and a memory for storing instructions executable by the processor. The processor, when executing the stored instructions, is configured to perform a method that includes receiving an instruction message from a calling terminal that initiates a call; and according to the instruction message, sending stored cloud card data of the initiating party of the call to the receiving party of the call such that the cloud card data is displayable in a call receiving interface of the receiving terminal of the call.

In another example, the present disclosure also provides a server, including a memory that stores one or more programs therein and one or more processors that are configured to execute the one or more programs. The one or more processors, when executing the stored one or more programs, is configured to perform a method that includes receiving an instruction message from a calling terminal that initiates a call; and according to the instruction message, sending stored cloud card data of the initiating party of the call to the receiving party of the call such that the cloud card data is displayable in a call receiving interface of the receiving terminal of the call.

Figure 11:
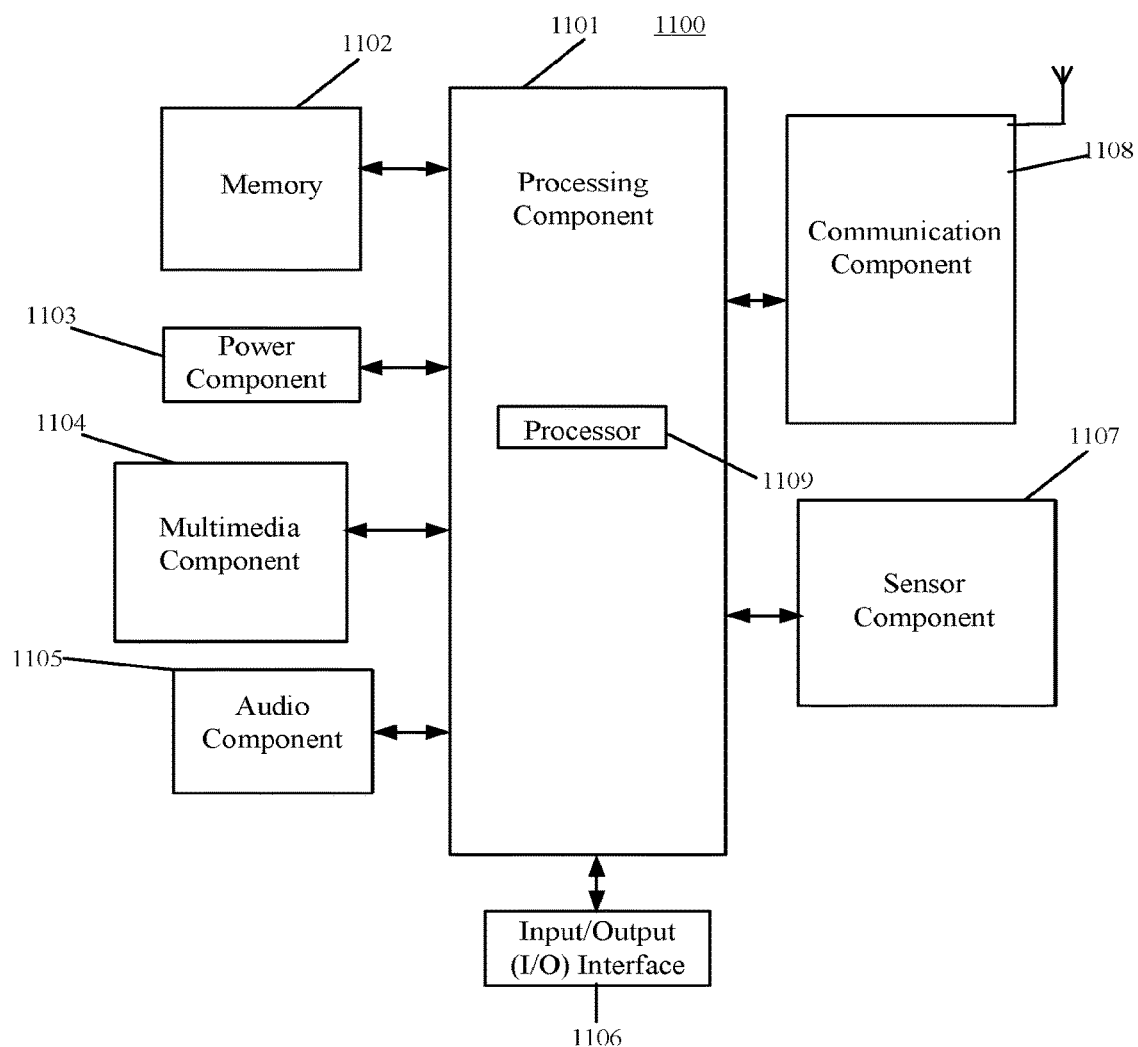
FIG. 11 is a block diagram of a device for sending a cloud card according to an exemplary embodiment.

FIG. 11 is a block diagram of a device for sending a cloud card according to an exemplary embodiment.

As shown in FIG. 11 is a device 1100 for sending a cloud card according to an exemplary embodiment. For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1101, a memory 1102, a power component 1103, a multimedia component 1104, an audio component 1105, an input/output (I/O) interface 1106, a sensor component 1107, and a communication component 1108.

The processing component 1101 typically controls overall operations of the device 1100, such as the operations associated with display, telephone calls, data communications, camera operations, and recording operations. The processing component 1101 may include one or more processors 1109 to execute instructions to perform all or part of the steps in the above described methods. Moreover, the processing component 1101 may include one or more modules which facilitate the interaction between the processing component 1101 and other components. For instance, the processing component 1101 may include a multimedia module to facilitate the interaction between the multimedia component 1104 and the processing component 1101.

The memory 1102 is configured to store various types of data to support the operation of the device 1100. Examples of such data include instructions for any applications or methods operated on the device 1100, contact data, phonebook data, messages, pictures, video, etc. The memory 1102 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1103 provides power to various components of the device 1100. The power component 1103 may include a power management system, one or more power sources, and any other components associated with the generation, management, and distribution of power in the device 1100.

The multimedia component 1104 includes a display providing an output interface between the device 1100 and the user. In some embodiments, the display may include a liquid crystal display (LCD) and a touch panel (TP). If the display includes the touch panel, the display may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1104 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1105 is configured to output and/or input audio signals. For example, the audio component 1105 includes a microphone ("MIC") configured to receive an external audio signal when the device 1100 is in an operation mode, such as a call mode, a recording mode, and a voice recognition mode. The received audio signal may be further stored in the memory 1102 or transmitted via the communication component 1108. In some embodiments, the audio component 1105 further includes a speaker to output audio signals.

The I/O interface 1106 provides an interface between the processing component 1101 and peripheral interface modules, such as a keyboard, a click wheel, buttons, and the like. The buttons may include, but are not limited to, a home button, a volume button, a starting button, and a locking button.

The sensor component 1107 includes one or more sensors to provide status assessments of various aspects of the device 1100. For instance, the sensor component 1107 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1107 may include a proximity sensor configured to detect the presence of nearby objects without any physical contact. The sensor component 1107 may also include a light sensor, such as a CMOS or CCD image sensor, for use in imaging applications. In some embodiments, the sensor component 1107 may also include an accelerometer sensor, a gyroscope sensor, a magnetic sensor, a pressure sensor, or a temperature sensor.

The communication component 1108 is configured to facilitate communication, wired or wirelessly, between the device 1100 and other devices. The device 1100 can access a wireless network based on a communication standard, such as WiFi, 2G, or 3G, or a combination thereof. In one exemplary embodiment, the communication component 1108 receives a broadcast signal or broadcast associated information from an external broadcast management system via a broadcast channel. In one exemplary embodiment, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1102, executable by the processor 1109 in the device 1100, for performing the above-described methods. For example, the non-transitory computer-readable storage medium may be a ROM, a RAM, a CD-ROM, a magnetic tape, a floppy disc, an optical data storage device, and the like.

In some embodiments, when the instructions in the storage medium are executed by a processor of a mobile terminal, the mobile terminal is enabled to perform a method for sending a cloud card, including determining whether a user has selected to include a cloud card in a call initiated by the user, and when the user has selected to include a cloud card in the call initiated by the user, sending an instruction message to a cloud server. The instruction message is used for instructing the cloud server to send cloud card data of the user which is stored in the cloud server to a receiving party of the call such that the cloud card data is displayable in a call receiving interface of the receiving party of the call.

In one example, the present disclosure also provides a device for sending a cloud card, and the device includes a processor and a memory for storing instructions executable by the processor. The processor, when executing the stored instructions, is configured to perform a method that includes receiving an instruction message from a calling terminal that initiates a call; and according to the instruction message, sending stored cloud card data of the initiating party of the call to the receiving party of the call such that the cloud card data is displayable in a call receiving interface of the receiving terminal of the call.

Figure 12:
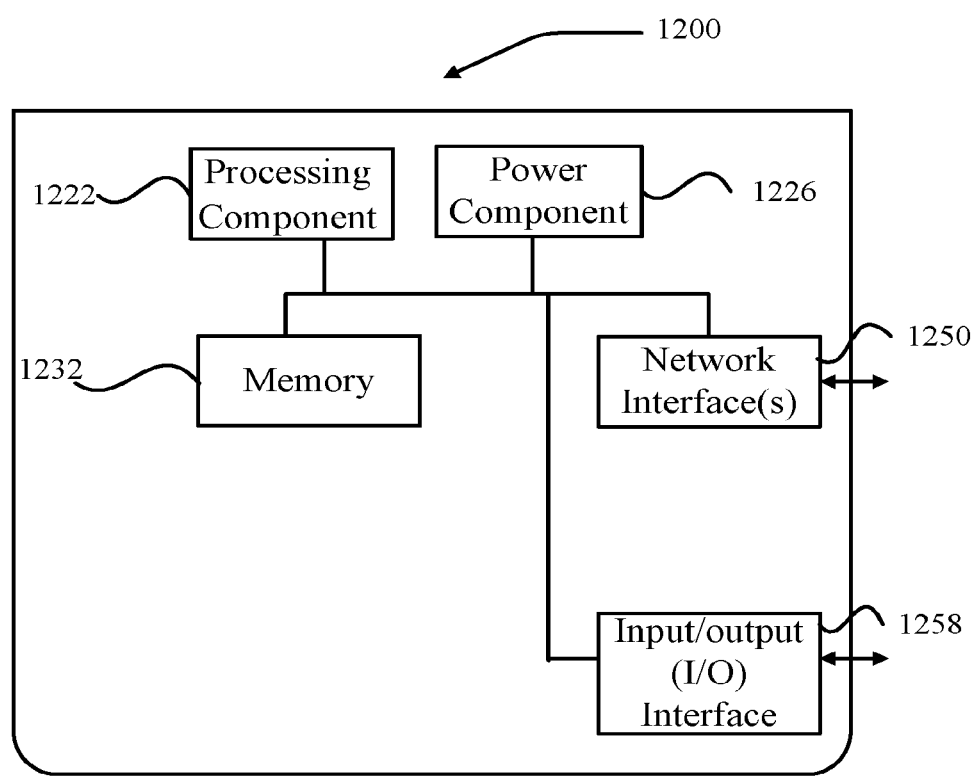
FIG. 12 is a block diagram of another device for sending a cloud card according to an exemplary embodiment.

FIG. 12 is a block diagram of a device 1200 for sending a cloud card according to an exemplary embodiment. For example, the device 1200 may correspond to a server, such as a cloud server as illustrated in this disclosure. Referring to FIG. 12, the device 1200 includes a processing component 1222 that further includes one or more processors, and memory resources represented by a memory 1232 for storing instructions executable by the processing component 1222, such as application programs. The application programs stored in the memory 1232 may include one or more modules each corresponding to a set of instructions. Further, the processing component 1222 is configured to execute the instructions to perform the above described method for sending a cloud card.

The device 1200 may also include a power component 1226 configured to perform power management of the device 1200, wired or wireless network interface(s) 1250 configured to connect the device 1200 to a network, and an input/output (I/O) interface 1258. The device 1200 may operate based on an operating system stored in the memory 1232, such as Windows Server™, Mac OS X™, Unix™, Linux™, FreeBSD™, or the like.

Other embodiments will be apparent to those skilled in the art from consideration of the specification and practice of the present disclosure. This application is intended to cover any variations, uses, or adaptations of the disclosed embodiments following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sending a virtual information card that is stored in a cloud storage system, comprising:
    determining, based on a user operation of a first terminal, whether to include the virtual information card in a call to a second terminal initiated by the first terminal, the virtual information card being associated with a user of the first terminal; and
    when determining to include the virtual information card in the call, sending, by the first terminal, an instruction message to a cloud server of the cloud storage system, the instruction message instructing the cloud server to send data corresponding to the virtual information card to the second terminal such that the virtual information card is displayable in a call receiving interface of the second terminal,
    wherein determining whether to include the virtual information card in the call to the second terminal initiated by the first terminal comprises:
        receiving an operational command through a call initiating interface of the first terminal, wherein the call initiating interface contains a setting option with respect to including a virtual information card in an initiated call; and
        when the operational command indicates that the setting option in the call initiating interface is selected, determining to include the virtual information card in the call to the second terminal initiated by the first terminal.

2. The method of claim 1, further comprising:
    acquiring the data corresponding to the virtual information card through a virtual information card setting interface of the first terminal; and
    uploading the acquired data corresponding to the virtual information card to the cloud server.

3. The method of claim 1, wherein the method further comprises:
    when receiving an incoming call by the first terminal, receiving data corresponding to another virtual information card from the cloud server, the another virtual information card being associated with a user of a calling terminal that initiates the incoming call; and
    displaying the another virtual information card in a call receiving interface of the first terminal.

4. The method of claim 3, wherein the method further comprises:
    storing the data corresponding to the another virtual information card displayed in the call receiving interface of the first terminal in a local contact list in response to a user instruction.

5. A device for sending a virtual information card that is stored in a cloud storage system, comprising:
    a processor; and
    a memory for storing instructions executable by the processor,
    wherein the processor is configured to perform:
        determining, based on a user operation of the device, whether to include the virtual information card in a call to a receiving terminal initiated by the device, the virtual information card being associated with a user of the device; and
        when determining to include the virtual information card in the call, sending, by the device, an instruction message to a cloud server of the cloud storage system, the instruction message instructing the cloud server to send data corresponding to the virtual information card to the receiving terminal such that the virtual information card is displayable in a call receiving interface of the receiving terminal,
    wherein, when determining whether to include the virtual information card in the call to the receiving terminal initiated by the device, the processor is further configured to perform:
        receiving an operational command through a call initiating interface of the device, wherein the call initiating interface contains a setting option with respect to including a virtual information card in an initiated call; and
        when the operational command indicates that the setting option in the call initiating interface is selected, determining to include the virtual information card in the call to the receiving terminal initiated by the device.

6. The device of claim 5, wherein the processor is further configured to perform:
    acquiring the data corresponding to the virtual information card through a virtual information card setting interface of the device; and uploading the acquired data corresponding to the virtual information card to the cloud server.

7. The device of claim 5, wherein the processor is further configured to perform:
   when receiving an incoming call, receiving data corresponding to another virtual information card from the cloud server, the another virtual information card being associated with a user of a calling terminal that initiates the incoming call; and
   displaying the another virtual information card in a call receiving interface of the device.

8. The device of claim 7, wherein the processor is further configured to perform:
   storing the data corresponding to the another virtual information card displayed in the call receiving interface of the device in a local contact list in response to a user instruction.

9. A non-transitory computer-readable storage medium storing instructions that, when being executed by a processor of a first terminal, for performing a method for sending a virtual information card that is stored in a cloud storage system, the method comprising:
   determining, based on a user operation of the first terminal, whether to include the virtual information card in a call to a second terminal initiated by the first terminal, the virtual information card being associated with a user of the first terminal; and
   when determining to include the virtual information card in the call, sending, by the first terminal, an instruction message to a cloud server of the cloud storage system, the instruction message instructing the cloud server to send data corresponding to the virtual information card to the second terminal such that the virtual information card is displayable in a call receiving interface of the second terminal,
   wherein determining whether to include the virtual information card in the call to the second terminal initiated by the first terminal comprises:
      receiving an operational command through a call initiating interface of the first terminal, wherein the call initiating interface contains a setting option with respect to including a virtual information card in an initiated call; and
      when the operational command indicates that the setting option in the call initiating interface is selected, determining to include the virtual information card in the call to the second terminal initiated by the first terminal.

10. The non-transitory computer-readable storage medium of claim 9, wherein the method further comprises:
    acquiring the data corresponding to the virtual information card through a virtual information card setting interface of the first terminal; and
    uploading the acquired data corresponding to the virtual information card to the cloud server.

11. The non-transitory computer-readable storage medium of claim 9, wherein the method further comprises:
    when receiving an incoming call by the first terminal, receiving data corresponding to another virtual information card from the cloud server, the another virtual information card being associated with a user of a calling terminal that initiates the incoming call; and
    displaying the another virtual information card in a call receiving interface of the first terminal.

12. The non-transitory computer-readable storage medium of claim 11, wherein the method further comprises:
    storing the data corresponding to the another virtual information card displayed in the call receiving interface of the first terminal in a local contact list in response to a user instruction.

\* \* \* \* \*

UNITED STATES PATENT AND TRADEMARK OFFICE
CERTIFICATE OF CORRECTION

PATENT NO. : 9,667,774 B2
APPLICATION NO. : 15/082490
DATED : May 30, 2017
INVENTOR(S) : Kun Niu et al.

Page 1 of 1

It is certified that error appears in the above-identified patent and that said Letters Patent is hereby corrected as shown below:

On the Title Page

Item (30), the Foreign Application Priority Data was not included. Item (30) should read:

-- (30) Foreign Application Priority Data
May 29, 2015 (CN) ............. 201510290678.2 --

Signed and Sealed this
Tenth Day of July, 2018

Andrei Iancu
*Director of the United States Patent and Trademark Office*